324-77

SR

XR 3,573,727

United States Patent [11] 3,573,727

[72] Inventor Stanley L. Freeny
Middletown, N.J.

[21] Appl. No. 773,014
[22] Filed Nov. 4, 1968
[45] Patented Apr. 6, 1971
[73] Assignee Bell Telephone Laboratories, Inc.
Murray Hill, Berkeley Heights, N.J.

[54] FEEDBACK ARRANGEMENT FOR MINIMIZING A SYSTEM PARAMETER
6 Claims, 2 Drawing Figs.

[52] U.S. Cl. .......... 340/146.1, 235/150.1, 235/151.31, 324/77, 325/324, 178/69.5
[51] Int. Cl. .......... H03k 5/18, H04l 1/10, H04b 3/46
[50] Field of Search .......... 340/347; 340/146.1; 235/150.1, 150.4, 151.13, 151.3, 151.31; 235/153; 324/77; 325/324, 341; 325/13; 178/69.5, 70; 179/15, (Arr), (Sinc); 307/232

[56] References Cited
UNITED STATES PATENTS

| | | | |
|---|---|---|---|
| 3,430,197 | 2/1969 | Brown .......... | 340/146.1 |
| 3,430,225 | 2/1969 | Auignon .......... | 340/347 |
| 3,466,430 | 9/1969 | Hardaway .......... | 235/150.1 |

*Primary Examiner*—Malcolm A. Morrison
*Assistant Examiner*—R. Stephen Dildine, Jr.
*Attorneys*—R. J. Guenther and Kenneth B. Hamlin

ABSTRACT: In a feedback circuit, the time at which a slicing circuit samples a received data signal is controlled to minimize the error rate in the digitized output signal. A parity check circuit controls a bistable multivibrator to provide a signal which repetitively varies the sampling time over a narrow range. The output of the bistable multivibrator is integrated to provide a signal which controls the sampling time over a wider range.

PATENTED APR 6 1971 3,573,727

INVENTOR
S. L. FREENY
BY
ATTORNEY

FEEDBACK ARRANGEMENT FOR MINIMIZING A SYSTEM PARAMETER

FIELD OF THE INVENTION

This invention relates to a negative feedback system and particularly to such a system in which a parameter is minimized.

BACKGROUND OF THE INVENTION

Most negative feedback systems are designed to control a specific parameter in the system. A transducer is normally employed to measure directly the specific parameter or measure another parameter related in a known manner to the specific parameter. The difference between the measured parameter and a reference value is normally used to vary an independent parameter of the system which varies the specific parameter.

Many feedback systems exist which control various parameters at the receiving end of a digital data transmission system. These feedback systems may control the sampling time or the slicing level of the digital data signal or the phase of a locally generated carrier when homodyne demodulation is employed. Sampling time, slicing level, and phase are among those parameters that affect the error rate of the data receiver.

While the purpose of these systems is to reduce the error rate, what is actually being measured when these parameters are varied is a physical characteristic of the digital data signal. For example, the phase of the carrier may be varied to render the received data signal symmetrical, the slicing level may be adjusted to be half the data signal amplitude, or the sampling time may be adjusted to be centered in the data eye. There is no guarantee, however, that this will result in a minimum error rate.

Systems do exist in which the slicing level of a digital data signal is controlled in response to a measured error rate. In these systems, however, the slicing level is changed in response to the absolute value of the error rate. With such a system, it is possible to preselect a desired error rate and control the slicing level to achieve that rate. Such a system, however, does not provide the minimum error rate.

BRIEF DESCRIPTION OF THE INVENTION

In the present invention, the time at which a received data signal is sampled is varied over a narrow range. The error rate of the sampled data is simultaneously measured to determine in which direction the sampling time must be moved in order to lower the error rate. An error direction signal is generated therefrom to control the sampling time.

In one embodiment, a parity check circuit at the output of a sampled slicing circuit drives a bistable multivibrator. The output of the bistable multivibrator is employed to vary the sampling time over the narrow range. The same output is integrated to provide an error direction signal which controls the sampling time over the wider range.

DETAILED DESCRIPTION

Figures 1, 2:
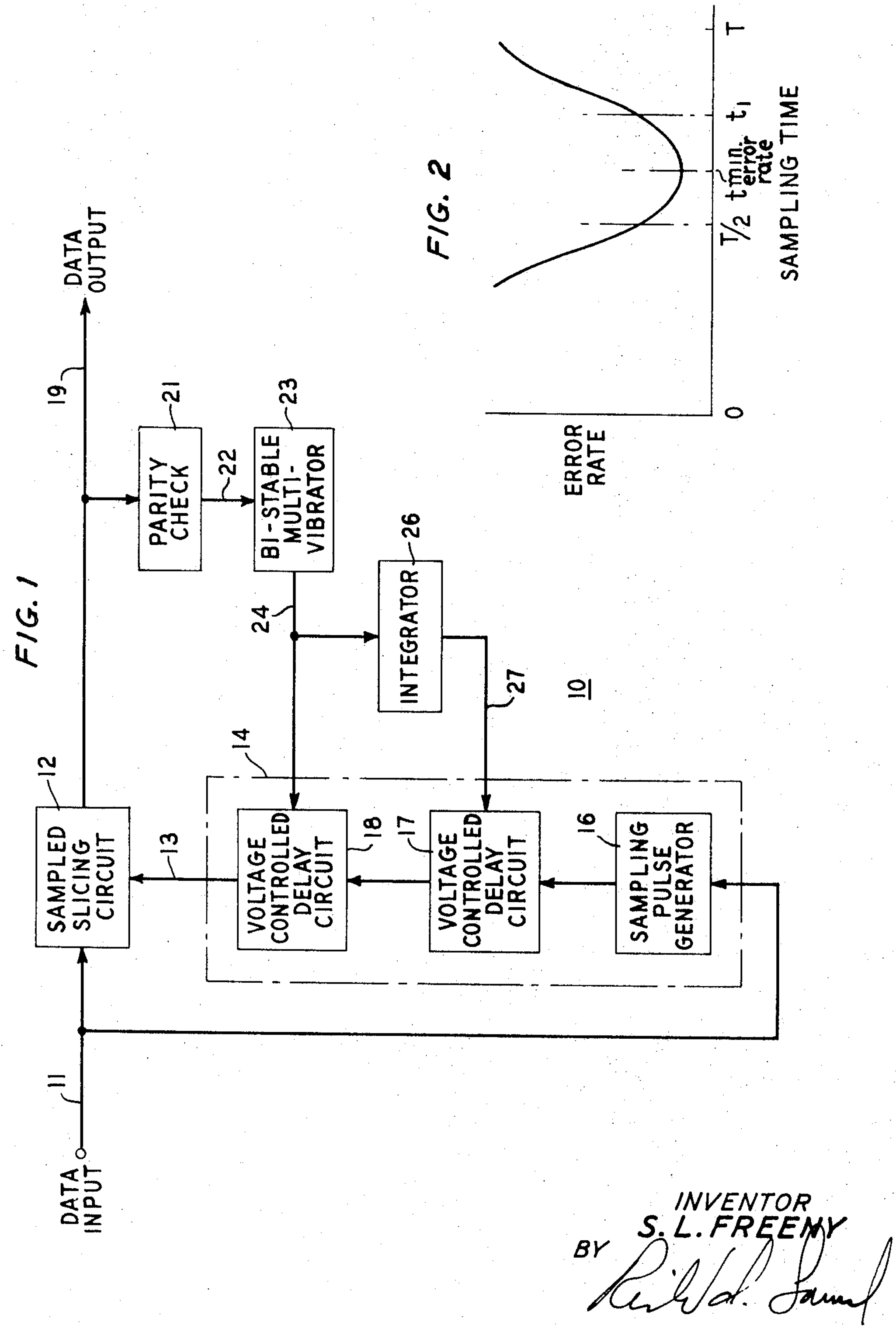
FIG. 1 is a block diagram showing a system embodying the principles of this invention.
FIG. 2 is a plot of a typical error rate versus sampling time characteristic in a sampled data system in which the principles of the invention are applied.

FIG. 2 shows a plot of the sampled data signal error rate as a function of the received data signal sampling time. No absolute values are given for the error rate axis. The sampling time axis is marked in terms of T, which is the pulse repetition interval of the data system time. The time T/2 is the center of the data eye. In the plot shown the minimum error rate occurs after the time T/2. It is well known that the minimum error rate usually occurs at a time other than T/2.

Therefore, it is seen that with the sampling time set at T/2, the error rate is greater than the minimum possible. Also, it is not possible to determine from the absolute value of the error rate whether the sampling time should be made earlier or later to minimize the error rate.

FIG. 1 shows a system 10 in which a received data signal, applied on a terminal 11, is sampled and sliced by a sampled slicing circuit 12 which is controlled by a timing pulse applied to an input lead 13. It should be understood that the slicing level of the sampled slicing circuit 12 could also be varied by an externally applied signal.

The timing pulse is supplied to the lead 13 by a circuit 14 which is synchronized with the received data signal. The circuit 14 includes a sampling pulse generator 16 which derives a pulse train from the received data signal. For example, the sampling pulse generator 16 may be a level detector which provides a pulse at each zero crossing of the received data signal. The pulse from the sampling pulse generator 16 is applied through first and second voltage controlled delay circuits 17 and 18 to terminal 13 of the sampled slicing circuit 12. The voltage controlled delay circuits may each be a voltage controlled monostable multivibrator.

The output of the sampled slicing circuit 12 is a digitized data signal, is applied to a terminal 19, as the output signal of the system 10, and to a parity check circuit 21.

Parity check circuits, such as the parity check circuit 21, are commonly employed in data handling systems for detecting prearranged redundancies in a data signal in order to insure that erroneous data is not accepted. Typically, a parity check circuit would be used to inhibit use of received data or to request retransmission. In the present system, a pulse is supplied by the parity check circuit 21 on a lead 22 each time parity does not check. The pulse on lead 22 is applied to a complementing input of a bistable multivibrator 23 which is toggled each time an error is detected.

The output of the bistable multivibrator 23, which varies between two fixed voltage levels, is applied by a lead 24 to the voltage controlled delay circuit 18. As the voltage on the lead 24 varies between the two fixed levels, the delay provided by voltage controlled delay circuit 18 is varied slightly between two fixed values.

Assume that the timing pulse on the lead 13 occurs at the time T/2. Assume also that when the next error is detected by the parity check circuit 21, the bistable multivibrator 23 provides a signal which moves the sampling pulse to an earlier time. According to FIG. 2 the error rate is increased. Therefore, the next error is detected more quickly by parity check circuit 21 since the timing pulse occurs earlier. After the next error is detected by the parity check circuit 21, the bistable multivibrator 23 is again toggled. Therefore, the time is moved back by T/2 second which results in a lower error rate. The output from the multivibrator 23 on the lead 24 is a square wave dwelling longer in the state which lowers the error rate than in the state which increases the error rate. In this case, the square wave dwells in the state which moves the sampling time later rather than earlier.

If, on the other hand, the sampling time were initially set $t_1$, which has the same absolute error rate corresponding to the time T/2, the signal provided by the bistable multivibrator 23 dwells in the state which moves the sampling time earlier.

The output of the bistable multivibrator 23 is applied to an integrator 26 which averages the short time fluctuation to provide a slowly varying signal. This signal indicates the direction in which the sampling time must be moved in order to minimize the error rate. The signal from the integrator 26 is applied by lead 27 to the voltage controlled delay circuit 17. The delay provided by voltage controlled delay circuit 17 is adjusted by the signal on lead 27 to move the timing pulse on lead 13 towards the minimum error rate. As the timing pulse is adjusted by the delay circuit 17, the frequency of the signal provided by bistable multivibrator 23 decreases and the signal becomes more symmetrical. When the signal from the bistable multivibrator 23 is symmetrical, the delay provided by the voltage delay controlled circuit 17 stabilizes, while the voltage controlled delay circuit 18 slowly shifts the timing pulse on lead 13 back and forth around the minimum error rate.

Therefore, it is seen that the voltage controlled delay circuit 18 has a very small dynamic range, while the voltage controlled delay circuit 17 has a much wider range of adjustment.

It should be understood that the above embodiment is merely illustrative of the principles of this invention. Other embodiments which fall within the spirit and scope of the invention can be built by those of ordinary skill in the art.

I claim:

1. In combination:
timing pulse providing means;
a sampled slicing circuit jointly responsive to said timing pulse applied at a first input terminal and to a received data signal applied at a second input terminal for providing a digitized data signal at an output terminal;
a parity check circuit responsive to said digitized data signal for providing an error pulse each time parity does not check;
a bistable multivibrator responsive to said error pulse for providing a control signal; and
means jointly responsive to said received data signal and to said control signal for providing said timing pulse.

2. The combination defined in claim 1 further comprising means for integrating said control signal for providing an integrated control signal.

3. The combination as defined in claim 2 in which said timing pulse providing means is also responsive to said integrated control signal.

4. The combination defined in claim 3 in which said timing pulse providing means further comprises:
a sampling pulse generator responsive to said received data signal for providing a sampling pulse having a fixed time relationship with said received data signal; and
first and second voltage controlled delay circuits responsive to said control signal and said integrated control signal respectively for additionally delaying said sampling pulse.

5. The combination as defined in claim 4 in which:
said first voltage controlled delay circuit has a first value of maximum delay and said second voltage controlled delay circuit has a second value of maximum delay; and
said second value of maximum delay is greater than said first value of maximum delay.

6. In combination:
a sampled slicing circuit jointly responsive to a received data signal and to a sampling signal for providing a digitized output signal;
means for generating said sampling signal;
means for varying the time of said sampling signal over a first range;
means for measuring the direction of change in error rate in said digitized output signal as the sampling signal is varied over said first range to provide a direction control signal; and
means responsive to said direction control signal for controlling said sampling signal.